United States Patent [19]

Donnelly et al.

[11] Patent Number: 5,334,407

[45] Date of Patent: Aug. 2, 1994

[54] COUSCOUS

[75] Inventors: Brendan J. Donnelly; Amar Debbouz; Kevin R. Hagen, all of Fargo, N. Dak.

[73] Assignee: North Dakota State University Research Foundation, Fargo, N. Dak.

[21] Appl. No.: 9,299

[22] Filed: Jan. 26, 1993

[51] Int. Cl.$^5$ ............................................. A23L 1/00
[52] U.S. Cl. ................................. 426/618; 426/622; 426/640
[58] Field of Search ................ 426/618, 622, 640, 285

[56] References Cited

U.S. PATENT DOCUMENTS

| | | | |
|---|---|---|---|
| 3,117,006 | 1/1964 | Wenger | 426/448 |
| 3,162,536 | 12/1964 | Kaufmann | 426/506 |
| 3,458,321 | 7/1969 | Reinhart et al. | 426/448 |
| 3,861,287 | 1/1975 | Manser | 99/348 |
| 4,044,165 | 8/1977 | Baumann | 426/557 |
| 4,423,082 | 12/1983 | Bauernfeind | 426/557 |
| 4,763,569 | 8/1988 | Wenger et al. | 99/348 |
| 4,888,180 | 12/1989 | Wu | 426/618 |
| 5,128,166 | 7/1992 | Babines et al. | 426/439 |

FOREIGN PATENT DOCUMENTS 2768767 4/1969 Australia .
2151898A 7/1985 United Kingdom .

OTHER PUBLICATIONS

Werner Seiler, "Cous-Cous, A New Production Progress Developed by Buhler/Buhler-Miag", 12 pages.
Buhler, "Couscous Manufacturing Plants", 6 pages.
S. M. Kaup and C. E. Walker, "Couscous in North Africa", Feb. 1986, pp. 179–182 of periodical Cereal Foods World.
The couscous discussion on pp. 274–277 of book entitled "Durum Wheat: Chemistry and Technology" edited by Giuseppe Fabriani and Claudia Lintas, published by The American Association of Cereal Chemists, Inc., 1988.
A copy of panels of a carton in which an agglomerated couscous, namely "Quick Couscous Pilaf," is marketed.
A copy of panels of a carton in which a particulate macaroni, namely "Acini di Pepe," is marketed.

Primary Examiner—George Yeung
Attorney, Agent, or Firm—Merchant, Gould, Smith, Edell, Welter & Schmidt

[57] ABSTRACT

A shelf-storable new and improved couscous food product satisfying traditional couscous granular mouthfeel is made by extruding a wheat-based doughy mass and cutting the extrudate into particles of uniform couscous size (i.e., between about 0.85 and about 2.5 mm. mesh). When examined under a magnification of 12 times, the new particles, although lacking the agglomeration structure of traditional couscous, have a mouthfeel structure characterized by (i) substantially smooth surfaces on the exterior thereof and (ii) angularly projecting edges on the exterior thereof. Further, the particles are substantially translucent, have a Water Absorption Index greater than 4.7, and have a substantially uniform and dense extrusion compacted composition comprised essentially of the starches and gluten-forming proteins in a blend of durum wheat flour or middlings or semolina and an optional content of flours or middlings or farinas of cereal grains other than durum wheat. At least about 80% of the dry solids weight of the starches in the product are gelatinized. The product is quickly hydratable in preparing it for consumption.

14 Claims, 2 Drawing Sheets

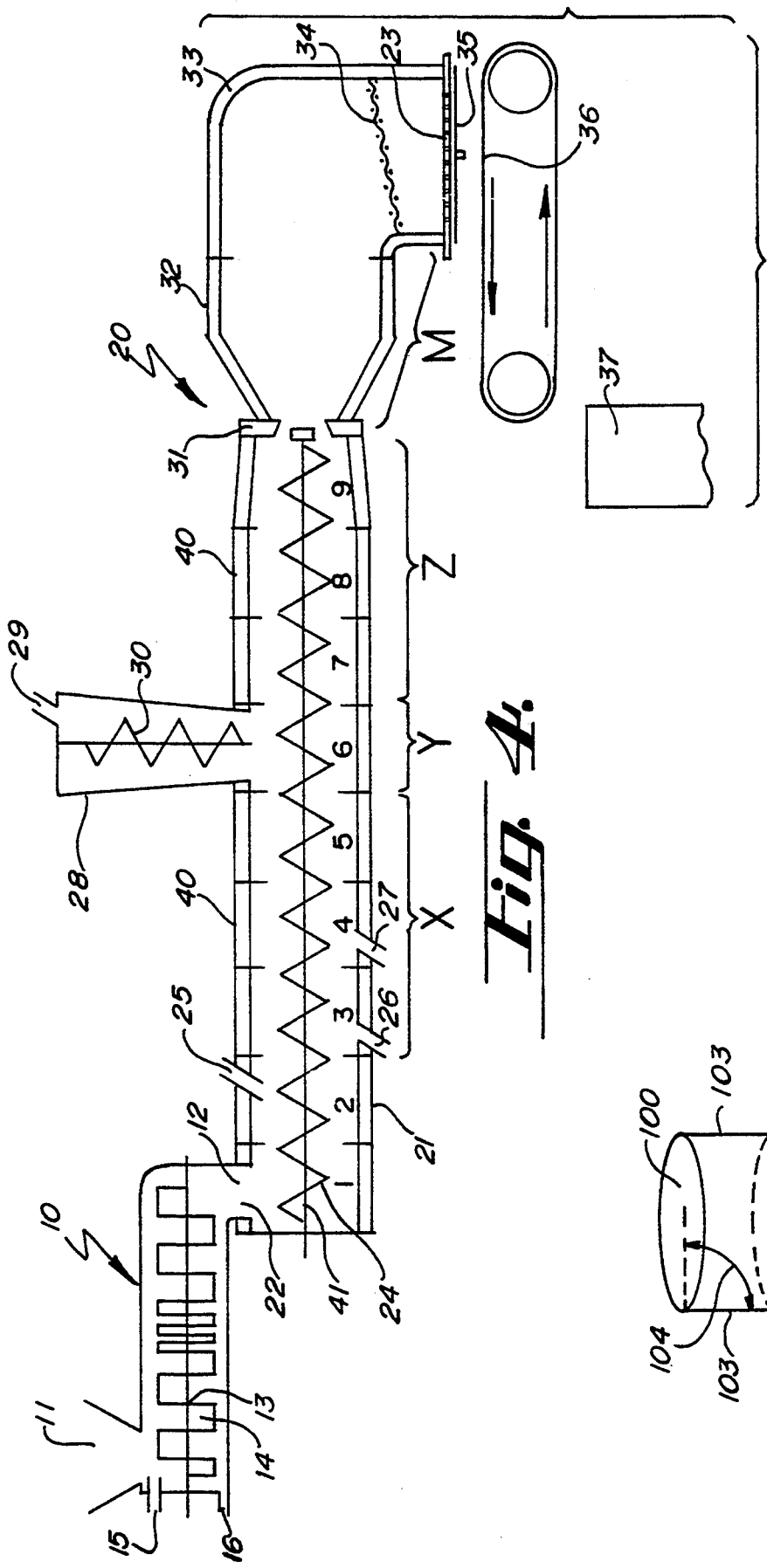

COUSCOUS

BACKGROUND OF THE INVENTION

This invention relates to the food product called couscous and particularly to a new and improved method for making couscous, to a new and improved couscous food product, and to speedy methods of preparing the new couscous product for consumption.

Couscous appears to be unique among cereal grain food products. It is distinguished by the special way it can be and traditionally has been prepared for consumption, namely by a series of simple hydrating and steaming steps. Generally, the steaming of the product to an edible condition is accomplished in a couscoussiere.

The traditional method for making couscous has been by mixing water with durum wheat semolina in a gissa or large wooden dish, then rubbing the mixture between the palms of one's hands to form agglomerates or small irregularly shaped granules, screening the granules to proper size, followed by steam precooking of the granules, and finally sun-drying those of the proper size. Sun-dried couscous has a long shelf life.

Until recently, the traditional method has been the only known method for making couscous. Credit goes to the Buhler company of Uzwil, Switzerland for successfully developing a method for the commercial production of couscous and for setting up the first commercial production facility in Sfax, Tunisia in 1979. As in the traditional method, the first step of the known commercial method is that of blending water and semolina until optimum agglomeration or granule formation is achieved. This is accomplished without forming the semolina into a unitary doughy mass. A mechanical mixer such as a paddle mixer is used for this step and the mixing takes about 3 minutes to provide granules of a moisture content of about 30–35%.

The next step of the known commercial method involves feeding the coarse, irregularly shaped and random-sized moist granules into a detacher where the granules of oversize are reduced and those of proper size are strengthened and shaped to form the couscous agglomerates. This step takes about 7 minutes.

Thereafter wet sifting may be done to separate undesired fines and oversized particles from the proper size range for the agglomerates. Fines are recycled back to the beginning mixing step and oversized agglomerates are routed back through the detacher.

Next the couscous agglomerates are passed on a conveyor belt through a steam cooking operation. This steaming step takes about 8 minutes at a temperature of about 180° C. The moisture of the couscous product is elevated to about 37% by weight by the time the product exits the steaming operation. In this steaming step, approximately 55 or 60% by weight of the starch is gelatinized.

The agglomerates are then dried in climate-controlled dryers. For example, a predrying stage may take 2 hours at 65° C. and a main drying stage may take 4½ hours at 55° C. Drying is conducted until the product moisture is reduced below 13%, preferably to 10–12%. The dried product is then cooled back to ambient conditions and sifted into oversized conglomerates, fine, medium, and coarse couscous, and undersized granules. Oversized agglomerates are passed through a roller mill and the resulting fraction is resifted. Undersized particles are metered into the beginning mixing step.

Couscous is a wheat-based particulate product that gives a granular mouthfeel. The proper size range for its dried particles is from about 0.85 to about 2.5 millimeter mesh. The particles of a specific couscous product should not vary more than about 1 mm mesh, preferably not more than about 0.5 mm mesh, between the largest and smallest Uniformity of size is a mark of quality for couscous and has not been easily achieved using known methods of manufacture. Particles lacking uniformity of shape and size result in irregular cooking quality and unsatisfactory mouthfeel. The required property of granular mouthfeel further means that the particles must remain separate and not stick together when they are rehydrated and cooked (as by steaming) for consumption. Cooking with sauces or moisture should soften the particles but not so greatly that they exhibit no resistance to the bite. Chewing of the particles should shear them, that is, subdivide them into smaller and smaller particles. The chewed particles should not give a brittle or rubbery or sticky or pasty or gummy feeling. The traditional granular mouthfeel associated with agglomerates is critical.

The major problems associated with the known commercial technique for manufacturing couscous have centered on quality and particularly the expense of getting quality. There is the initial expense caused by using durum semolina and avoiding the more economical durum flour as a starting material, the extra expense involved in special reworking of powdery fines and crushing oversized particles, the base expense for the extensive capital equipment as well as the relatively large factory space to accommodate it, and the unrelenting expenses associated with the several costly handling steps.

The thrust of this invention takes the couscous art in an entirely different direction from that which it has taken in the past. In this regard, insofar as is known, no one has heretofore proposed a method for the manufacture of couscous that would consistently yield particles of proper size and of relatively uniform size and shape, without any significant powdery fines and without any significant oversized particles. It further appears that no one in the past has had the slightest inkling that substantially uniformly shaped and smooth surfaced particles could satisfy couscous criteria and in fact give the traditional couscous granular mouthfeel heretofore associated only with the irregularly shaped agglomerated prior art particles. It still further appears that no one ever conceived that uniformly shaped particles could possess still other couscous sought-for attributes such as desired firmness associated with mouthfeel, desired avoidance of objectionable stickiness, and desired quick rehydration and reduced time of steam cooking for consumption—plus no significant loss of color and even an enhancement of the yellowness for durum couscous (but color is highly dependent on the composition of the starting material). It is in this uncharted new direction that the couscous art is taken by this invention.

SUMMARY OF THE INVENTION

The present invention results from the discovery, despite years and even centuries of couscous practices requiring the contrary, that couscous can in fact be made by extrusion processing of a doughy mass.

The invention provides a shelf-storable improved couscous food product satisfying traditional couscous granular mouthfeel. The product consists essentially of non-sticky free-flowing wheat-based particles having a size between about 0.85 and about 2.5 mm mesh, and having a moisture content below about 13% by weight. It is relatively quickly hydratable and steam cooked without loss of its particulate integrity. It is particularly characterized by the fact that its particles are substantially translucent, have a Water Absorption Index greater than 4.7, and have a substantially uniform and dense extrusion-compacted composition. The composition is comprised essentially of the starches and gluten-forming proteins in a blend of, by dry solids weight, at least about 65% up to 100% of durum wheat flour or middlings or semolina and about 35% down to 0% of flours or middlings or farinas of cereal grains other than durum wheat. At least about 80% of the dry solids weight of the starches is gelatinized. The particles are further characterized by having, when examined under a magnification of 12 times, (i) substantially smooth surfaces on the exterior thereof and (ii) angularly projecting edges on the exterior thereof.

Preferred particles are such that their substantially smooth exterior surfaces include opposing surfaces in generally parallel relationship and include side surfaces extending between and angularly connected at about 90° to the opposing surfaces. The angularly projecting edges of such particles comprise the edges formed at the angular connections between the side surfaces and the opposing surfaces. Preferred particles also exhibit their shortest linear dimension in a direction substantially perpendicular to the opposing surfaces. The ideal couscous product of the invention has particles of substantially the same size and shape.

One method of preparing the new product for consumption consists essentially of adding the product to boiling water and simmering the product in the boiling water for 2 minutes, followed by allowing the product to stand in the water without additional heating for 2 minutes.

Another method of preparing the new product for consumption consists essentially of hydrating the product in a single hydration step using sufficient water at 25° C. for 2 to 6 minutes for the product to increase its weight at least to 180% of its original weight by absorbing the water, and then steaming the hydrated product for up to 3 to 4 minutes with steam at 90° C. or higher.

The improved method for making this new couscous food product is an extrusion method. A major step in conducting the method is that of extruding a cooked mixture of wheat-based composition and water maintained under an elevated temperature between about 70° C. and 100° C. and a pressure from about 13 bar up to about 41 bar and a moisture content of at least 25% but not over 45% by weight through an extrusion die having openings of substantially uniform size within the size limits from about 0.5 square millimeters up to about 7 square millimeters. The wheat-based composition is comprised essentially of the starches and gluten-forming proteins in a blend of, by dry solids weight, at least about 65% up to 100% of durum wheat flour or middlings or semolina and about 35% down to 0% of flours or middlings or farinas of cereal grains other than durum wheat. The extrudate of the die is cut and then dried under elevated temperatures to a moisture content below 13% by weight.

Preferably the extrusion of the cooked mixture is conducted at a linear extrusion rate in excess of 1,200 mm/min. Also, the extrusion die employed preferably has a substantially flat outer face and the cutting surface of the extrudate is conducted at a cutting rate in excess of 500 cuts per minute across the face of the die. The linear extrusion rate and the cutting rate are preferably such that the extrudate is cut into particles having cut lengths with parallel surfaces spaced apart at least about 0.5 mm up to about 2.5 mm.

Steps of the method preliminary to the extrusion step comprise:

a) Forming a mixture of the wheat-based composition and water in a preconditioner so as to have a moisture content between about 20% and 30% by weight and an elevated temperature up to but not over 100° C., the mixture having a dwell time of mixing in the preconditioner between about 30 seconds and 2 minutes;

b) Passing the mixture from the preconditioner into the barrel of an extruder having a cooking zone, venting zone, forming zone, stabilization zone, and the aforesaid extrusion die, and having a rotatable screw in the cooking, venting, and forming zones;

c) Rotating the screw of the extruder to advance the mixture sequentially through the cooking, venting, and forming zones and out of the barrel into the stabilization zone and through the extrusion die, the dwell time for the mixture to pass through all zones of the extruder and out the extrusion die being between about 1.0 and 2.5 minutes;

d) Raising the temperature of the mixture to a temperature in excess of 90° C. up to about 130° C. and increasing its moisture content to a level in excess of 30% by weight up to about 50% by weight in the cooking zone;

e) Reducing the moisture content of the mixture by removing moisture therefrom in the venting zone but maintaining the moisture content of the mixture at a level in excess of 25% by weight and not over 45% by weight as the mixture leaves the venting zone;

f) Increasing the pressure on the mixture and maintaining its temperature between about 70° C. and 100° C. as it is advanced through the forming zone, but dropping the pressure on the mixture in the stabilization zone, the pressure in the forming zone being at least 13 bar higher than the pressure in the stabilization zone, the pressure in the stabilization zone being the pressure under which the cooked mixture is extruded through the extrusion die.

The preferred method also contemplates forcing the mixture through a constriction between the forming zone and stabilization zone.

Still other features and benefits and advantages of the invention will be evident as this description proceeds.

BRIEF DESCRIPTION OF THE DRAWING

FIG. 1a is a schematic enlarged perspective view of a preferred shape for a couscous particle of the invention;

FIG. 4 is a schematic illustration of suitable apparatus elements for conducting the new method of making couscous according to the invention.

DESCRIPTION OF THE PREFERRED EMBODIMENT

Figure 1:
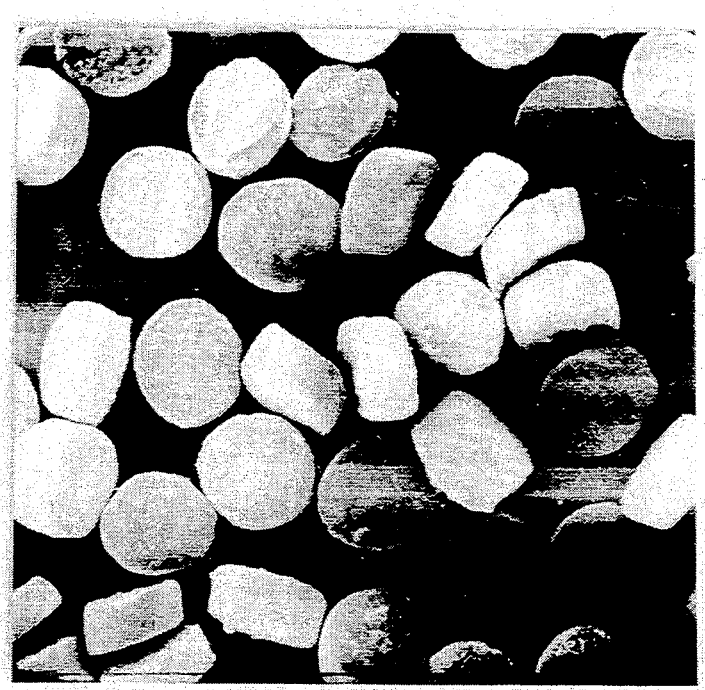
FIG. 1 is a photograph of preferred couscous particles of this invention showing them magnified 12 times.

The new method for making couscous does not require the specific apparatus here discussed. Nevertheless, the method is better understood by reference to a useful apparatus for conducting it.

Referring to FIG. 4, the preconditioner or conditioning cylinder 10 has an entrance 11 and an exit 12 and preferably contains twin laterally juxtaposed counter-rotating shafts 13 (only one schematically illustrated) equipped with paddles 14 oriented at various pitches to advance the raw material through the preconditioner from entrance to exit and to provide a controlled dwell time for the material in the preconditioner as the material is being mixed. The preconditioner also includes a water conduit 15 with metering means for introduction of water near its entrance, as well as steam injection ports 16 with metering means for controlled injection of steam along the bottom of the interior of the preconditioner.

The paddles 14 preferably are in three different groups. At the entrance end 11 the paddles are oriented so that they forcibly convey the material forward to the exit 12. In the middle portion, the paddles preferably are at a neutral angle and therefore do not themselves effectively function to move material through the preconditioner. They act to mix the material with the steam and water. The paddles near the exit portion 12 are preferably located at an angle or pitch such that they relatively tend to push or compact material in a reverse direction (back toward entrance) as the material is being forced forward through the preconditioner by the build up caused by the forward-motion paddles near the entrance end. The pitch of these paddles and the shaft rpm are adjusted so as to achieve the desired dwell time of between about 30 seconds and 2.5 minutes in the preconditioner.

Material exiting the preconditioner is fed into the barrel 21 of an extruder 20. The entrance 22 of extruder 20 may be joined to the exit of the preconditioner, if desired.

A useful extruder barrel is known in the United States under the trade name "Wenger TX-52" (screw elements of 52-mm diameter), and is described with a process for its use in Wenget et al. U.S. Pat. No. 4,763,569 of Aug. 16, 1988, here incorporated by reference. An extruder barrel 21 having a length to diameter ratio of about 25:1 is useful for practicing this invention. As illustrated in FIG. 4, it suitably includes nine head elements numbered 1 through 9, each about 15 cm. in length.

The composite barrel 21 has several zones, namely a cooking zone X, a venting zone Y, and a forming zone Z. The complete extruder 20, as styled for this invention, also has a special stabilization zone M and finally terminates at its exit end in an extrusion die 23, which is preferably horizontally oriented. Within the barrel portion of the extruder, and extending through the cooking, venting and forming zones, is a rotatable shaft 41 carrying rotatable screw propulsion means 24 for moving material not only through the barrel 21 (in which screw propulsion is located), but also all the way through stabilization zone M (where no screw propulsion is needed) to the exit die 23. Although single screw extruders may be employed successfully for the practice of the invention, the most preferred extruders are comprised of twin intermeshing co-rotating screw elements such as employed in the "Wenger TX-52".

The portion of the shaft 41 extending through the cooking zone (head elements 3, 4 and 5) is preferably equipped with several reverse pitch shearlocks, that is, contoured bodies for effecting shearing action on the mixture being worked.

Each of the head elements 1 through 9 has a jacket 40 through which a heating or cooling fluid is circulated to control the head element temperature. Of course, head element temperatures can be controlled by other means, such as, for example, by electricity.

A water conduit 25 into head 2 is for adding water to the mixture, and steam entrances 26 and 27 into heads 3 and 4 are for injecting the mixture with steam.

Head 6 is provided with a vent stack 28 for the escape of moisture from the mixture, primarily in the form of steam vapors. To facilitate rapid removal of vapors, a negative pressure of 0.3 bar gauge to 0.5 bar gauge is drawn on the exit vent 29. An auger 30 or similar device is employed to retain or return material that expands out of barrel 21 into the stack 28 back into the extruder barrel 21 while the negative pressure is applied.

The forming zone Z is next and terminates at the end of the extruder barrel 21 where a choke or constriction 31 for practicing the invention is located. The constriction 31 used in conducting experiments of this invention had two openings of about 6 mm diameter—one at the end of each screw of a twin screw extruder—with both openings emptying to a center channel of about 9.5 mm diameter which in turn emptied into the stabilization zone M.

The stabilization zone M is defined by a continuation housing 32. The housing 32 used for experiments had a length of about 25 cm and a diameter of about 7.5 cm. The stabilization zone continues through the elbow 33 which effects a change of direction.

A screen 34 (e.g., 0.6 mm mesh or 30 mesh U.S. Standard) may desirably be employed at the interior surface of die 23 to improve uniformity of flow across the die and to screen out foreign particles from the dough mass, thereby saving the die 23 from unnecessary wear.

The die 23 is preferably oriented in a horizontal plane for vertical passage through the die. Dies for practicing the invention have a multiplicity of very small die openings or holes. All openings for any one die are preferably of equal size (i.e. equal in area dimension). The openings may vary from about 0.5 to about 5 or 6 or possibly 7 square millimeters for different dies. Square or multi-sided openings may be used, but ideally, the openings are circular to give a cylindrical shape to resulting extrusions. A vermicelli die available commercially in the United States as Maldari #42801 (having 1.219 mm (0.048-inch) diameter openings) gives excellent results.

A cutter 35 such as a four blade knife is fitted flush to the outer die face or surface and rotated at a significant speed (e.g., to provide at least 500 cuts per minute). The cutter slices extruded material into stub-like particles which on drying give the required couscous size, namely between about 0.85 mm (possibly as short as 0.5 mm) and about 2.5 mm for the extruded lengths.

The cut extrudate is dried by moving the particles through drying gasses such as in a climate-controlled drying atmosphere. The particles may fall or drop on a conveyor 36 and then pass through a climate-controlled atmosphere. They may be dumped from the conveyor 36 into a climate-controlled drying atmosphere in a special space 37, or dropped from the die into such a space. The special space may be a stack or column of rising drying gases, or a fluidized bed, or a rotary screen dryer. Still other drying systems may be used for drying the particles. Countercurrent air flow systems are especially useful, but any system effecting relative movement between the particles and a climate-controlled drying atmosphere can be effective.

The raw material employed as a starting material in the practice of the invention is wheat based. The basic raw material is a milled product, and most preferably a milled product of durum wheat. Optionally, but not preferably, a varying percentage from zero up to about 35% by dry solids weight of the raw material may comprise the milled product (such as flour or middlings or farina) of other cereal grains. Such cereal grains include wheats other than durum (e.g., hard red spring, hard red winter, soft red, soft white, etc.) plus corn or maize, millet, sorghum, milo, and any others as desired. The flour or farina of cereal grains (including durum flour or middlings or semolina) should account for at least about 90% of the dry solids weight of the total composition, if not 100% of it. The flour or middlings or semolina of durum should always dominate. The wheat proteins, particularly the proteins known to be gluten-forming (and preferably the gluten-forming proteins of durum), perform an important binder-type function. They form a water-insoluble network or protein mass of extensible or extended character about the starch molecules. Sometimes their performance is referred to as an enrobing of the starch. They cause starchy couscous particles of the invention to resist breakdown and keep their particulate integrity (i.e., general shape) when they are prepared for consumption. The gluten-forming wheat proteins preferably should at least equal and preferably exceed about 8% of the dry solids weight of the composition of the particles. This criterion is generally met when starting compositions contain durum flour or middlings or semolina in an amount accounting for at least about 65% of the dry solids weight. Of course, the protein in durum flour or middlings or semolina can vary depending on growing conditions, but it generally exceeds 10% of the dry weight. The starches of cereal grains will generally account for at least about 75% or 80% of the dry solids weight of the compositions. This criterion is generally met by using compositions comprised essentially of flours or middlings or farinas of cereal grains (i.e., 65% to 100% durum and 35% to 0% other grains). Other ingredients not detracting from the essential starch and essential wheat protein may be present. For example, vegetable powders, fibers, and protein fractions from materials other than cereal grains may be employed in modest quantities (generally not over about 10% of dry solids weight) for the properties such constituents impart. Modest quantities of salts or inorganic components may be used. Surface active agents and other processing aids are useful and sparingly employed. While durum semolina is needed to make quality couscous by agglomeration methods, durum wheat flour instead of semolina may be employed in the practice of this invention with results almost indistinguishable from results obtained using durum wheat semolina.

The yellow color highly prized for couscous results primarily from the use of durum as starting material. Couscous made according to the present invention, using durum wheat flour or middlings or semolina, has a more intense color than couscous of comparable formula made according to the agglomeration methods of the prior art. Substitution of varying amounts of other cereal-based raw materials proportionally reduces the color intensity and can adversely affect texture and flavor.

Preliminary mixing of the raw material solids with water and steam in a preconditioner is done to give a mixture having a moisture content between about 20% and 30% by weight, preferably at least about 25 or 26% up to about 28 or 29% by weight. The temperature elevation during this mixing generally will be to at least about 70° C., and preferably at least about 80° C. to around 90° C. or more, but not over about 100° C. Starch of the mixture is partially hydrated and partially gelatinized in this step. Preferred time for this step is between about 1.5 and 2 minutes.

The mixture is then passed into the extruder barrel and the screws are rotated to advance the mixture through the cooking, venting, and forming zones and out the barrel into the stabilization zone and through the extrusion die. Dwell time in the extruder from entrance to exit through the die ranges between about 1.0 and 2.5 minutes, preferably between about 1.5 and 2.5 minutes.

In the cooking zone, the mixture is raised to a temperature in excess of 90° C. up to about 130° C. (preferably to at least about 100° C. up to about 120° C.), and its moisture is increased to a level in excess of 30% by weight (preferably in excess of 35% by weight) up to 50% by weight. Water and steam are injected at varying rates, such as, for example, between about 4 and 10 kg/hr for water and between about 0.15 and 0.30 kg/min for steam under 5 or 6 bar (80 psi). Modest shearing of the mixture on its way through the extruder is desirable, and is accomplished in the cooking zone. Shearing tends to cause the mixture to form itself into a dough. While modest shearing improves product unity, integrity, and quality, excessive shearing is undesired because it causes structural breakdown of the starch and protein network in the raw material, thereby increasing the amount of undesirable soluble starch in the final product. By conducting shear under cooking conditions of relatively high moisture content and elevated temperature, such structural breakdown is reduced and the desired amount of shearing action is achieved.

The moisture vapors escaping from the mixture in the venting zone cause a lowering of the temperature of the dough, but the lowering or reduction is not to a temperature below 70° C. The temperature is most preferably reduced below 100° C. but not below 80° C. in this zone. The moisture of the dough is reduced by the vapor escape but is maintained at a level in excess of 25% and not over 45% by weight (preferably in excess of 30% and not over 40%) as the mixture leaves the venting zone.

Next comes the forming zone where the temperature of the dough is maintained between about 70° C. and 100° C. (preferably between 80° C. and 100° C.) as it is subjected to increases of pressure following the relaxation of pressure in the venting zone. Pressures in the forming zone are created by the unrelenting thrust of the screw 24 in pushing the mixture toward the constriction 31 at the end of the extruder barrel.

The constriction functions to obstruct to some degree the movement of material from the forming zone Z into the stabilization zone M and increase the retention time of the mixture in the extruder barrel. It also functions to provide a pressure differential between the two zones, and to achieve a desired back pressure in the forming zone.

The constriction at 31 may be omitted with loss of its benefits. At least some degree of constriction is desirable and constrictions which maintain a pressure differential of at least about 13 bar (200 psi) up to possibly about 70 bar (1,000 psi) between the forming zone Z and stabilization zone M are preferred. The pressures applied to the mixture within the forming zone Z should exceed about 27 bar (400 psi). Preferred forming pressures are between about 55 bar (800 psi) and about 90 bar (1,300 psi). Forming pressures as high as 95 or 102 bar (1,400 or 1,500 psi) are useful. Forming pressures compress and compact the dough and enhance its development and contribute to the structural integrity or unity of the end product.

Then comes the drop in pressure as the material passes through the constriction 31 into the stabilization zone. The material in the stabilization zone 32—held at reduced pressure compared to the forming zone—is allowed to expand. The stabilization zone 32 increases the retention time of the dough prior to extrusion and allows it to more thoroughly hydrate and achieve a higher degree of gelatinization. Dwell time in the stabilization zone should at least exceed half the dwell time in the forming zone. Stabilization zone pressures generally range between about 13 bar (200 psi) to about 41 bar (600 psi). Preferably they do not exceed 34 bar (500 psi). What is significant is that a relatively high moisture content (25%-45% by weight, generally 30-40%), plus a relatively high temperature (70°-100° C.), and relatively low pressure (13-41 bar) all work together in the stabilization zone to keep the mixture in a relatively flowable state as it is urged along and out through the extrusion die.

The extrudate is cut and the cut extrudate promptly subjected to drying to a moisture content below about 13% by weight. Low moisture contributes to long shelf storability. Drying to about 10-12% moisture by weight is useful. It for the most part is unnecessary or undesirable to incur the expense of drying to a level of moisture below about 9 or 10%, although drying to lower moisture such as 6% or so is permissible. Drying is preferably done in an atmosphere of controlled humidity and temperature. Suitable relative humidity may vary from 30% to 90%, preferably with gradual lowering of the humidity in the controlled atmosphere as drying takes place. While drying under a wide range of temperatures is possible, the range should be limited to between 40° C. and 90° C. with the range between 70° C. and 85° C. or about 80° C. the most preferred. At about 80° C. and 30% relative humidity, drying to a moisture below 13% by weight can be accomplished in well less than 30 minutes, whether the particles are on a belt or are tossed in a rotary screen or free-falling or suspended in a fluidized bed or floating in the drying atmosphere. Drying involves relative movement between the cut particles and the drying atmosphere.

The high rate of cutting extrudate is especially significant. Slice-like cutting of extrudate is effected by moving a cutter (e.g., a knife or blade) across the face of the die at such a rate that the size range for the dried particles is from about 0.85 to about 2.5 mm mesh. Generally this means a rate in excess of about 500 cuts per minute, and usually over 1,000 or over 1,500 cuts per minute. The rate of cutting necessarily is rather high to achieve the small particles required, but preferrably is kept within bounds to avoid excessive die wear. The cutting rate also depends on a reasonable and commercially practicable linear extrusion rate. A minimal practical extrusion rate generally will be in excess of about 1,200 mm/min, and usually over about 1,500 mm/min. Illustratively in tests of the invention, a four-blade cutter was rotated at 360 rpm to effect 1,440 cuts per minute across the face of the die having openings of 1,219 mm and a linear extrusion rate of about 1,600 mm/min.

Figure 2:
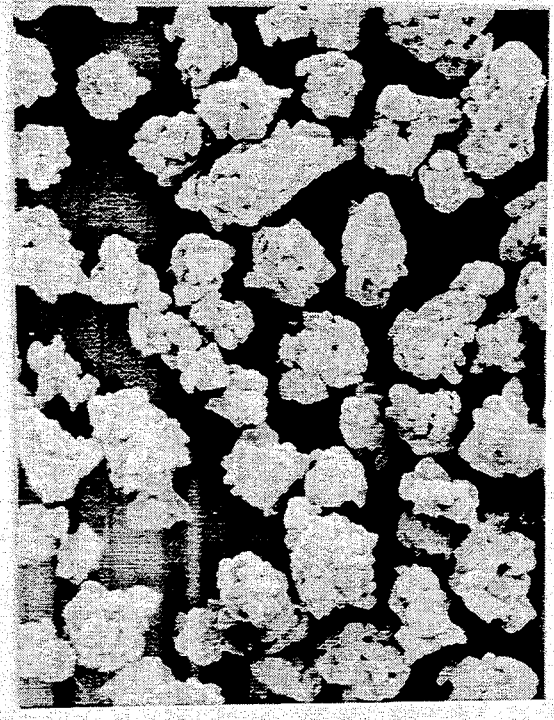
FIGS. 2 and 3 are photographs illustrative of agglomerated couscous particles formed according to prior art, namely hand-made and machine-made agglomerations, respectively, each photograph showing the particles magnified 12 times.
Figure 3:
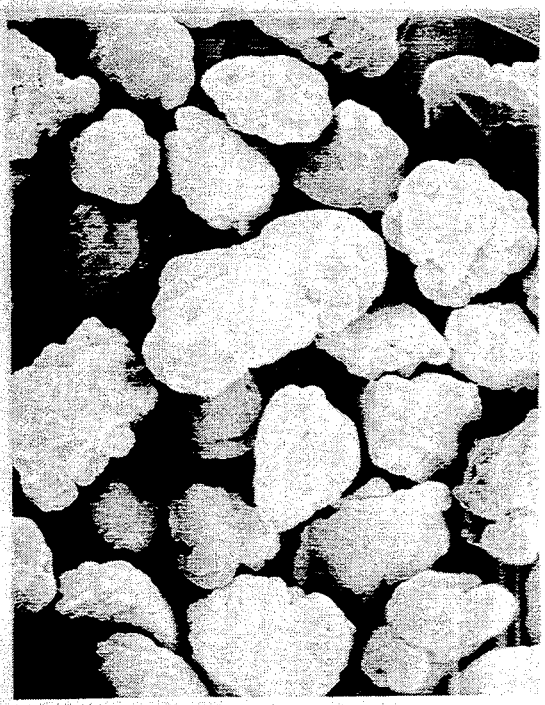

The cut and dried extrudate at a magnification of 12 times (FIG. 1) has substantially smooth opposing exterior surfaces 100 and 102 (see FIG. 1a) in generally parallel relation. These substantially parallel opposing surfaces 100 and 102 are at opposite ends of a very short stub body (e.g., a stub cylinder) having substantially smooth side exterior surfaces 103. The side surfaces 103 are angularly connected to the opposing surfaces to form angular projecting edges. The angle is approximately 90°, i.e., a right angle 104. Particle shapes varying from the ideal are possible, but some key features are important, namely that the particles under a magnification of 12 times must have substantially smooth surfaces on the exterior thereof, plus angularly projecting edges on the exterior thereof (such as formed at the 90° angles of connection between opposing and side surfaces). More specifically, the particles under a magnification of 12 times preferably have (i) substantially smooth opposing exterior surfaces in generally parallel relationship and (ii) substantially smooth side exterior surfaces extending between and angularly connected at about 90 degrees to the opposing surfaces and (iii) a distance between the opposing surfaces no greater than the greatest linear dimension of the particle in directions parallel to the opposing surfaces. That greatest linear dimension in directions parallel to the opposing surfaces is not in excess of 180% (preferably not over 150%) of the shortest linear dimension parallel to the opposing surfaces (as, for example, when non-circular die openings are employed). The combination of these characteristics—especially the combination of the substantially smooth surfaces (such as, for example, formed by extrusion and cutting) and the angularly projecting edges (such as, for example, formed at the 90° angle of connection between surfaces)—surprisingly gives traditional couscous mouthfeel. Dimensions perpendicular to opposing surfaces should not be substantially greater than the maximum linear dimension parallel to opposing surfaces. Ideally, the shortest linear dimension is perpendicular to the opposing parallel surfaces, and preferably is not less than 0.5 mm. Generally, the shortest linear dimension will fall in the range between about 30% and 70% of the greatest linear dimension parallel to the opposing surface of the particle. The distinctive new particles are shown in FIG. 1 and are to be compared to the prior art couscous agglomerated particles of FIGS. 2 and 3.

The particles formed by extrusion maintain their integrity under normal handling conditions. They are not easily friable and do not break down into fragments when hydrated during preparation for consumption. They have a highly compacted (i.e., extrusion-compacted) and dense composition. The composition is substantially uniform throughout the particles, and the particles are substantially translucent, allowing the passage of light through them in a relatively uniform manner, which is totally different from the interference to light passage exhibited by agglomerated couscous particles. The agglomerated particles have voids. They are not compacted; and while they are partially gelatinized, they are opaque to the passage of light.

In specific experiments, durum wheat semolina blended with 0.75% by weight glyceryl monostearate (tradename "Myvaplex") as a surfactant was fed into a preconditioner at the rate of 68 kg/hr. Water was metered in at the rate of 10.0 kg/hr, and steam at about 5 bar (80 psi) was injected along the bottom of the preconditioner at a rate of about 0.26–0.29 kg/min No effort was made to elevate pressure beyond ambient atmospheric pressure. The mixture exiting the preconditioner in different test runs was at a temperature of about 93° C. to 99° C. and moisture levels of about 26% to 28%. The conditioning cylinder shafts were operated at a speed of 100 rpm to provide a retention time of 1.5 to 2 minutes. Four conditions of extrusion following the preconditioning steps are now set forth in table form:

| Item | Example 1 | Example 2 | Example 3 | Example 4 |
| --- | --- | --- | --- | --- |
| Extruder Shaft Speed RPM | 160 | 120 | 140 | 160 |
| Extruder Water (kg/hr) | 9.3 | 7.1 | 4.6 | 9.3 |
| Extruder Steam (kg/min) | 0.184 | 0.175 | 0.170 | 0.273 |
| Vacuum (Bar) | 0.33 | 0.33 | 0.33 | 0.33 |
| Load Required (KW) | 3.8 | 4.9 | 4.9 | 4.2 |
| Temp Head 3 (Celsius) | 88 | 100 | 100 | 97 |
| Temp Head 4 (Celsius) | 100 | 109 | 122 | 119 |
| Temp Head 5 (Celsius) | 98 | 106 | 110 | 106 |
| Temp Head 6 | Vent | Vent | Vent | Vent |
| Temp Head 7 (Celsius) | 86 | 89 | 96 | 89 |
| Temp Head 8 (Celsius) | 91 | 91 | 97 | 93 |
| Temp Head 9 (Celsius) | 86 | 85 | 85 | 85 |
| Pressure Head 7 (Bar) | 23.8 | 37.4 | 37.4 | 27.2 |
| Pressure Head 8 (Bar) | 64.6 | 74.8 | 71.4 | 68.0 |
| Pressure Head 9 (Bar) | 68.0 | 81.6 | 85.0 | 68.0 |
| Pressure M Zone (Bar) | 27.2 | 27.2 | 34.0 | 23.8 |
| Starch Gelatinization (%) | 88.8 | 95.3 | 94.1 | 97.0 |
| Water Absorption Index | 4.8 | 5.4 | 5.4 | 5.2 |
| % Moisture as Extruded | 37.1 | 34.6 | 32.5 | 37.5 |
| Total Two-Step Rehydrating Time (min) | 15 | 11.5 | 10.0 | 11.0 |

Starch gelatinization was measured by the enzymatic method set forth by Shetty, R.M., Lineback, D.R., and Seib, P.A., titled "Determining the Degree of Starch Gelatinization", published in Cereal Chemistry, May—June 1974, Vol. 51, pp. 364–375, here incorporated by reference. The total starch content was determined by "AACC Method 76-11; Starch—Glucoamylase Method With Subsequent Measurement of Glucose With Glucose Oxidase; First Approval Oct. 8, 1976; Reviewed Oct. 27, 1982," published by the American Association of Cereal Chemists, here incorporated by reference. Most significant is the fact that at least 80% by weight and in most instances over 85% or 90% and even over 95% by weight of the starch of the mixture becomes gelatinized by the process conditions and thus rendered highly absorptive of water. This is accomplished without significantly raising the water-soluble constituents, and in fact causing a relative lowering of them.

The Water Absorption Index (WAI) is a useful indicator of the water absorption capabilities of the products of the invention. This index represents the weight of a centrifuged (water-containing) gel obtained per gram of dry sample. The method for determining the WAI is described by Anderson, R.A., Conway, H.F., Pfeifer, V.F., and Griffen, E.L., Jr., in an article entitled "Gelatinization of Corn Grits by Roll and Extrusion Cooking", published in Cereal Science Today, Jan. 1969 Vol. 14(1), pp. 4–7, 11–12, here incorporated by reference. Couscous of this invention has a WAI of at least 4.7 and even over 5.0, which is believed to be unusually high and indicative of quick and thorough hydration in preparing the product for consumption.

Another index of interest but not as widely accepted as meaningful is the Water Solubility Index (WSI), also described by Andersen et al. in the aforenoted article. Tests made on couscous of this invention have indicated a WSI generally less than 4.5 and in most instances less than 4.0. This indicates low formation of undesirable solubles.

The total rehydrating time in the above table refers to the total time for rehydration of the couscous as conducted by a two-step process combined with steaming. Couscous of the present invention is relatively quickly hydrated and even more quickly steam cooked to a ready-to-eat condition as compared to couscous prepared by agglomeration. The steaming time to prepare couscous of this invention for consumption has been observed to be less than one-half the time required for steaming of couscous made by agglomeration. For example, products of the present invention were ready for consumption after two steaming times of 3 minutes each, whereas a test using an agglomerated product required two steaming times of 8 minutes each. Each steaming step for couscous of the present invention was preceded by a period of rehydration (at room temperature) such as used conventionally in preparing agglomerated couscous for consumption. In the first rehydration period, the couscous sample was allowed to absorb water to 60% of its weight; and during the second, it was allowed to absorb water to 30% of its initial weight. (Conventional rehydration involves discrete steps of limited water absorption.) The total time for conventional two-step rehydration and two-step steaming of couscous to edible condition is on the order of about 15–20 minutes for couscous of this invention about 10–15 minutes for limited hydration and about 6 minutes of steaming), whereas the total time for conventional rehydration and steaming of agglomerated couscous to edible condition generally requires at least about 10 minutes more.

Of even greater significance is the fact that couscous of the present invention may be prepared for consumption in a single hydration step involving submerging it in water at 25° C. for at least 2 minutes up to 6 minutes, until the couscous particles increase in weight at least to 180% of their original weight by absorbing water (e.g., going from 1.0 gram to 1.8 grams), and then steaming that hydrated product for up to 3–4 minutes with steam at 90° C. or higher.

Still further, couscous of the present invention, when prepared for consumption using boiling water, requires less than one-half the time of the agglomerated product. Product of the present invention can be prepared for consumption by adding a sample to boiling water, allowing it to simmer for 2 minutes or less and allowing it to stand without additional heating for up to 2 minutes.

In general, extruded product moisture levels between about 32 and 38% by weight further enhance smoothness of texture for the end product. Lower extrusion moisture levels tend to increase extrusion pressures and cause an undesired increase in the mechanical shear action of the dough. Raising the moisture content about 40% tends to increase the risk or possibility of a drop in quality toward a lower WAI, less gelatinization, and some unwanted stickiness associated with cutting the product at the die surface. Cooking zone temperatures at or below 100° C. tend to yield end products having somewhat less starch gelatinization and requiring longer rehydration. As temperatures in the cooking zone are increased, most preferably into the range of 110° C. to 115° C., the end products tend to exhibit improved WAI, increased gelatinization, and a shortening of rehydration times. Generally, the higher climate-controlled drying temperatures of 70° C. to 80° C. give improved product integrity, shortened rehydration times and an overall better quality product.

There is thus provided a new couscous product and a new method to make couscous, namely by extrusion processing. The useful quantity of product resulting from practice of this invention is exceedingly high, even in essence 100%, with no significant fines or oversized particles.

Although couscous prepared by agglomeration techniques requires sifting and grading to separate the fine, medium, and coarse grades, no such extra step is necessary when practicing this invention. All particles can be directly formed to satisfy the size criteria within 0.85 mm mesh to 2.5 mm mesh, with all particles of a particular batch substantially uniform in shape and equal in size and ready for packaging. Waste is avoided and product uniformity is achieved with fewer pieces of equipment and fewer process requirements and therefore with great savings as compared to the excessive expense of the commercial agglomeration technique.

Those skilled in the art will readily recognize that this invention may be embodied in other specific forms than illustrated without departing from its spirit or essential characteristics. The foregoing discussion is therefore to be considered as illustrative and not restrictive, the scope of the invention being indicated by the appended claims; and all variations coming within the meaning and range of equivalency of the claims are intended to be embraced thereby.

That which is claimed is:

1. A shelf-storable couscous food product consisting essentially of non-sticky free-flowing wheat-based particles having a size between about 0.85 and about 2.5 mm mesh, and having a moisture content below about 13% by weight, said couscous food product being relatively quickly hydratable and steam cooked without loss of its particulate integrity and being particularly characterized by the fact that the particles thereof are substantially translucent, have a Water Absorption Index greater than 4.7, and have a substantially uniform and dense extrusion-compacted composition comprised essentially of the starches and gluten-forming proteins in a blend of, by dry solids weight, at least about 65% up to 100% of durum wheat flour or middlings or semolina and about 35% down to 0% of flours or middlings or farinas of cereal grains other than durum wheat, at least about 80% of the dry solids weight of said starches being gelatinized, said particles being further characterized by having, when examined under a magnification of 12 times, (i) substantially smooth surfaces on the exterior thereof and (ii) angularly projecting edges on the exterior thereof.

2. The product of claim 1 wherein said substantially smooth surfaces include opposing surfaces in generally parallel relationship and include side surfaces extending between and angularly connected at about 90° to said opposing surfaces, and wherein said angularly projecting edges comprise the edges formed at said angular connections between said side surfaces and said opposing surfaces.

3. The product of claim 2 wherein said particles exhibit their shortest linear dimension in a direction substantially perpendicular to said opposing surfaces.

4. The product of claim 1 wherein the size of said particles from the largest to the smallest does not vary more than 1 mm mesh.

5. The product of claim 1 wherein said particles are of substantially the same size and shape.

6. The product of claim 1 wherein said substantially smooth surfaces include opposing surfaces in generally parallel relationship and include side surfaces extending between and angularly connected at about 90° to said opposing surfaces, wherein said angularly projecting edges comprise the edges formed at said angular connections between said side surfaces and said opposing surfaces, and wherein said particles exhibit their shortest linear dimension in a direction substantially perpendicular to said opposing surfaces and said shortest linear dimension is not less than 0.5 mm.

7. The product of claim 6 wherein the size of said particles from the largest to the smallest does not vary more than 1 mm mesh.

8. The product of claim 6 wherein said particles are of substantially the same size and shape.

9. The product of claim 1 wherein over 90 percent of the dry solids weight of said starches is gelatinized and said Water Absorption Index is over 5.0.

10. The product of claim 9 wherein the size of said particles from the largest to the smallest does not vary more than 1 mm mesh.

11. The product of claim 9 wherein said particles are of substantially the same size and shape.

12. The product of claim 9 wherein said substantially smooth surfaces include opposing surfaces in generally parallel relationship and include side surfaces extending between and angularly connected at about 90° to said opposing surfaces, and wherein said angularly projecting edges comprise the edges formed at said angular connections between said side surfaces and said opposing surfaces.

13. The product of claim 12 wherein said particles exhibit their shortest linear dimension in a direction substantially perpendicular to said opposing surfaces.

14. The product of claim 13 wherein said shortest linear dimension is not less than 0.5 mm.

* * * * *

UNITED STATES PATENT AND TRADEMARK OFFICE
CERTIFICATE OF CORRECTION

PATENT NO. : 5,334,407
DATED : August 2, 1994
INVENTOR(S) : Brendan J. Donnelly et al.

It is certified that error appears in the above-identified patent and that said Letters Patent is hereby corrected as shown below:

On column 5, line 46, please delete "Wenget" and substitute therefore --Wenger--

On column 6, line 29, please delete "emptied" and substitute therefore --empties--

On column 10, line 5, please delete "1,219" and substitute therefore --1.219--

On column 12, line 8, please delete "Andersen" and substitute therefore --Anderson--

On column 12, line 39, please insert --(e.g., -- after the word "invention"

Signed and Sealed this

Fifteenth Day of November, 1994

Attest:

BRUCE LEHMAN

*Attesting Officer*  *Commissioner of Patents and Trademarks*